April 3, 1928.
O. W. HEISE
1,664,776
NONVIBRATING GAUGE
Filed Aug. 26, 1925
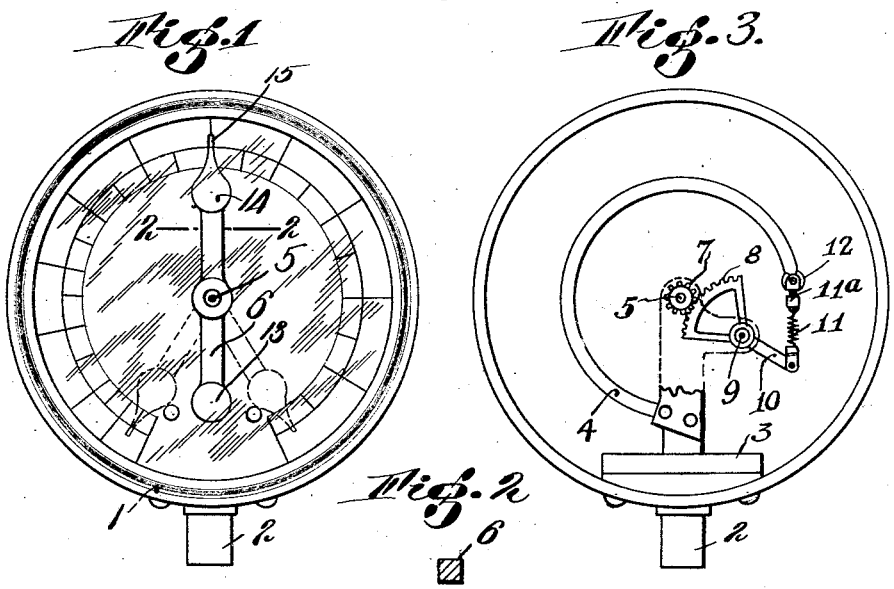
Inventor
Otto W. Heise,
by Roberts Roberts & Cushman
Attorneys Patented Apr. 3, 1928.

1,664,776

UNITED STATES PATENT OFFICE.

OTTO W. HEISE, OF BRIDGEPORT, CONNECTICUT, ASSIGNOR, BY MESNE ASSIGNMENTS, TO CONSOLIDATED ASHCROFT HANCOCK COMPANY, OF NEW YORK, N. Y., A CORPORATION OF DELAWARE.

NONVIBRATING GAUGE.

Application filed August 26, 1925. Serial No. 52,704.

This invention pertains to pressure gauges and more particularly to gauges for use in measuring pulsating or rapidly fluctuating pressures.

Situations are frequently met with in engineering practice when it is desirable to know the mean pressure of a fluid whose pressure fluctuates rapidly between limits, although its mean pressure may vary but slowly. Such a condition may occur, for example, in a pipe line served by a reciprocating pump. Under such circumstances the usual Bourdon gauge, commonly employed for indicating pressures which vary but slowly, is incapable of performing any useful function for when it is attempted to use a Bourdon gauge in such a situation, the indicator or needle is set into violent oscillation through a wide arc of movement so that it is difficult, if not impossible, to obtain anything but the roughest estimate of the mean pressure.

While it has heretofore been proposed to remedy this defect of the ordinary Bourdon gauge by providing a dash pot to damp the oscillation of the needle, such dash pot, to be dependable, must be of accurate construction and thus adds very considerably to the initial cost of the gauge, while the relatively moving parts of the dash pot gradually wear until the device loses its efficacy.

I have now discovered a mode of obtaining the desired results without adding materially to the initial cost of the gauge and by the employment of means which does not deteriorate with use. Whereas makers of gauges have heretofore sought to make the parts of the gauge movement and index needle as light as possible, consistent with strength, so that they may respond quickly to every slightest pressure variation, in accordance with my present invention I take a directly opposite course and give to some element of the gauge, for example the index needle, which normally moves in response to every change in position of the Bourdon tube or other pressure responsive device, a mass of such amount and so distributed that it tends to resist movement in response to rapid vibration or quick reversal in direction of the force being measured. Thus the index needle which otherwise would swing rapidly at each pulsation of the applied force, is substantially unresponsive to rapid pulsation, but nevertheless assumes a position accurately representative of the mean of the upper and lower limits of the pressure variations. I provide a spring for transmitting oscillations of the end of the Bourdon tube to the gauge movement since a spring at this point absorbs some of the vibrations thus making it unnecessary to employ as heavy an index as would otherwise be required to damp the oscillations.

In the accompanying drawings I have illustrated one form of the invention by way of example. In the drawings, Fig. 1 is a front elevation of a gauge embodying the present invention, the index indicating a mean pressure midway between the upper and lower limits of the gauge;

Fig. 2 is a section substantially on the line 2—2 of Fig. 1, showing a preferred form of the index needle; and Fig. 3 is a front elevation of the gauge of Fig. 1 but with the dial removed.

Referring to Figs. 1, 2, and 3, the numeral 1 indicates the outer casing of the gauge, provided with the usual supporting stem 2 connected to the bracket 3 within the casing. The bracket 3 supports one end of a Bourdon tube 4 and also carries a frame providing bearings for an index staff 5 to whose forward end the index 6 is attached. The staff 5 also carries a pinion 7 which meshes with a segment gear 8 carried by a lever pivoted upon a staff 9 and having an arm 10 which is connected to the free end 12 of the Bourdon tube by means of a yielding link 11, consisting for example of an open coiled helical spring, preferably provided with means for adjusting its tension as indicated for example at 11ª. In accordance with the present construction, the index needle 6 is much heavier than usual. Preferably its central or shank portion is substantially of the section shown in Fig. 2, while it is provided at its opposite ends with solid balls or disks 13 and 14 respectively, the member 14 carrying the pointer 15. These solid balls or disks 13 and 14 are so placed relatively to the axis of the pointer that it is substantially counterbalanced with an equal weight on each side of the axis of the pointer. The needle 6 thus differs radically from index needles as heretofore constructed wherein the principal aim has been to decrease weight, and its large mass gives it far more inertia than index needles of usual construction. The provision of the spring link makes it unnecessary to employ so heavy a needle or index as would otherwise be required since the spring tends to absorb some of the shorter vibrations, while on the other hand the spring allows slight freedom of movement of the end of the tube relatively to the gauge movement so that the resistance offered by the inertia of the index needle does not impose as heavy a strain upon the gauge movement as is the case where there is a rigid connection between the tube and needle.

When a gauge thus constructed is subjected to a rapidly fluctuating pressure of pulsating character the tube 4 tends to vibrate rapidly in time with the pressure pulsations. Owing to its inertia the heavy needle can not be oscillated by the force transmitted from the Bourdon tube through the gauge movement with sufficient rapidity to permit it to move in time with the pressure fluctuations, and since the connections between the needle and tube provide the needle with large leverage, it not only remains substantially quiet itself, but also tends to prevent the tube from vibrating.

Although the needle tends to resist any force tending to oscillate it rapidly, it nevertheless responds freely to slowly applied force and thus slow progressive changes in pressure within the Bourdon tube causes the latter and the needle to move in substantially the same manner as the corresponding parts of an ordinary gauge. Thus, while the heavy needle by its inertia tends to resist rapid oscillation, it accurately registers the mean pressure obtaining in the Bourdon tube at any instant, and in Fig. 1 the needle is shown as indicating such a mean pressure lying substantially midway between the upper and lower limits of the gauge dial. With an ordinary index needle the gauge would under the effects of a pressure pulsating between zero and 200 pounds, for example, oscillate with great rapidity between the upper and lower limits of the gauge, as indicated by the dotted lines in Fig. 1, so that no accurate estimate could be obtained of the mean pressure, whereas with a gauge as herein disclosed the mean pressure may be very accurately determined.

While I have herein shown several desirable embodiments of my invention, I wish it to be understood that the invention is not necessarily restricted to the specific construction herein described and shown, but that the broad underlying principle may well be incorporated in mechanisms of other specific construction and detail.

I claim:

1. An instrument of the class described comprising a Bourdon tube, an index staff, means for transmitting movement from the tube to the index staff, said movement transmitting means including a yielding connection, and an index needle mounted upon the index staff, the needle having such mass that its inertia acting in conjunction with said yielding connection absorbs rapid vibrational movements of the tube without substantially affecting response of the index needle to movements of the tube in response to slow pressure changes.

2. In an instrument of the class described, the combination with its mechanical train inclusive of the pressure responsive element, of an oscillatory member having such mass and attached to said mechanical train in such manner as to resist by its inertia alone relatively rapid pressure fluctuation impulses without affecting the response of the instrument to slow pressure changes, and a resilient connection in said train between the pressure responsive elements and said oscillatory member.

3. An instrument of the class described comprising a Bourdon tube, an index staff, a dial, means for transmitting movement from Bourdon tube to the index staff, said movement transmitting means including an open coiled helical spring, an index needle secured to the index staff in front of the dial, said needle being of such mass as to oppose substantial inertia resistance to rapid oscillations without substantially affecting its freedom to move slowly in either direction, and the spring being of such strength as to tend to absorb certain of the vibrations transmitted from the Bourdon tube.

4. In an instrument of the class described the combination of a Bourdon tube, an index staff, a dial, means for transmitting movement from said tube to said staff, said means including an open coiled helical spring, and a weighted index needle secured to said staff in front of said dial, the mass of said needle being such as to present substantial inertia resistance to rapid oscillations of said needle, and the strength of said spring being such as to absorb the shorter vibrations from said tube thus preventing their transmission to said staff.

Signed by me at Bridgeport, Connecticut, this 24 day of Aug., 1925.

OTTO W. HEISE.